(12) United States Patent
Takamatsu et al.

(10) Patent No.: US 11,063,412 B2
(45) Date of Patent: Jul. 13, 2021

(54) CORRUGATED TUBE AND WIRE HARNESS

(71) Applicant: Yazaki Corporation, Tokyo (JP)

(72) Inventors: Masahiro Takamatsu, Shizuoka (JP); Masaru Kiuchi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/573,974

(22) Filed: Sep. 17, 2019

(65) Prior Publication Data

US 2020/0099207 A1 Mar. 26, 2020

(30) Foreign Application Priority Data

Sep. 25, 2018 (JP) .................................. 2018-178619

(51) Int. Cl.
*H02G 3/04* (2006.01)
*H01B 7/00* (2006.01)
*F16L 11/11* (2006.01)
*B60R 16/02* (2006.01)

(52) U.S. Cl.
CPC ............ *H02G 3/0468* (2013.01); *F16L 11/11* (2013.01); *H01B 7/0045* (2013.01); *B60R 16/0207* (2013.01)

(58) Field of Classification Search
CPC ..... H02G 3/0468; F16L 11/11; H01B 7/0045; B60R 16/0207
USPC ...................................................... 174/72 A
See application file for complete search history.

(56) References Cited

U.S. PATENT DOCUMENTS

| | | | | |
|---|---|---|---|---|
| 3,717,718 A | * | 2/1973 | Schmidtchen | H01B 9/0677 174/106 D |
| 3,903,928 A | * | 9/1975 | Sykes | F16L 9/21 138/109 |
| 4,053,275 A | * | 10/1977 | Kramer, Sr. | B29C 53/30 425/389 |
| 4,970,351 A | * | 11/1990 | Kirlin | H02G 3/0406 138/121 |

(Continued)

FOREIGN PATENT DOCUMENTS

EP  1 675 232 A2  6/2006
FR  2 936 090 A1  3/2010

(Continued)

OTHER PUBLICATIONS

Rockwell Hardness Testing and Measure of Plastics, https://omnexus.specialchem.com/polymer-properties/properties/hardness-rockwell-m.*

(Continued)

*Primary Examiner* — Sherman Ng
(74) *Attorney, Agent, or Firm* — Kenealy Vaidya LLP

(57) ABSTRACT

The invention includes a tubular main body that protects an electric wire accommodated in an internal space, and a tubular or annular outer layer body stacked concentrically with the main body on an outer peripheral surface of the main body. The outer layer body is either a molded body formed into a shape having a hardness lower than that of the main body, and capable of absorbing sound when the outer layer body comes into contact with an external contacting object, or a molded body including a material having a hardness lower than that of the main body, and capable of absorbing sound when the outer layer body comes into contact with an external contacting object.

5 Claims, 5 Drawing Sheets

(56) References Cited

U.S. PATENT DOCUMENTS

| | | | | |
|---|---|---|---|---|
| 6,321,794 | B1* | 11/2001 | Ishida | F16L 11/118 |
| | | | | 138/121 |
| 6,755,217 | B1* | 6/2004 | Yoshida | F16L 11/112 |
| | | | | 138/121 |
| 2006/0201567 | A1 | 9/2006 | Goddard et al. | |
| 2008/0036242 | A1* | 2/2008 | Glance | B62D 21/15 |
| | | | | 296/187.09 |
| 2010/0183893 | A1* | 7/2010 | Duquette | F16L 9/06 |
| | | | | 428/586 |
| 2011/0297415 | A1* | 12/2011 | Katou | B60R 16/0215 |
| | | | | 174/68.3 |
| 2016/0238166 | A1* | 8/2016 | Fukuda | B60R 16/0215 |
| 2016/0322797 | A1* | 11/2016 | Kimoto | H02G 3/04 |
| 2017/0310094 | A1* | 10/2017 | Chu | H02G 3/0468 |
| 2018/0248346 | A1* | 8/2018 | Yoshida | H02G 3/0468 |
| 2019/0048780 | A1* | 2/2019 | Cho | F01N 13/1816 |

FOREIGN PATENT DOCUMENTS

| | | |
|---|---|---|
| JP | 68-139822 U | 9/1983 |
| JP | 2000-287331 A | 10/2000 |
| JP | 2012-175879 A | 9/2012 |
| JP | 2016-152714 A | 8/2016 |
| JP | 2016-152715 A | 8/2016 |

OTHER PUBLICATIONS

Shore D Hardness Test (Durometer Scale)—Hardness of Plastic Materials, https://omnexus.specialchem.com/polymer-properties/properties/hardness-shore-d.*

* cited by examiner

CORRUGATED TUBE AND WIRE HARNESS

CROSS-REFERENCE TO RELATED APPLICATION(S)

The present application claims priority to and incorporates by reference the entire contents of Japanese Patent Application No. 2018-178619 filed in Japan on Sep. 25, 2018.

BACKGROUND OF THE INVENTION

1. Field of the Invention

The present invention relates to a corrugated tube and a wire harness.

2. Description of the Related Art

Conventionally, a corrugated tube is known as an exterior member for protecting an electric wire from the outside.

A corrugated tube covers an electric wire from the outside to protect it from external peripheral parts, by accommodating the electric wire in the internal space of a tubular main body. For example, Japanese Patent Application Laid-open No. 2016-152714 and Japanese Patent Application Laid-open No. 2016-152715 below disclose a corrugated tube having a cylindrically formed main body and a soft cushioning portion provided on an inner wall surface of the main body. In the corrugated tube of Japanese Patent Application Laid-open No. 2016-152714 and Japanese Patent Application Laid-open No. 2016-152715, the function of protecting the electric wire is enhanced by bringing the cushioning portion into contact with the electric wire to avoid contact of the main body with the electric wire. Note that the corrugated tube forms a wire harness together with the electric wire or the like which is a part to be protected.

Incidentally, in a corrugated tube, in order to protect an electric wire from external peripheral parts, a main body is formed to have a hardness suitable for the protection. For this reason, in a case where the corrugated tube is spaced apart from peripheral parts, the corrugated tube may generate sound when the outer surface of the main body comes into contact with the peripheral parts. For example, in a case where the corrugated tube is mounted on a vehicle such as an automobile along with the electric wire, an external force caused by road surface input or the like is transmitted to the electric wire or the corrugated tube. At this time, the corrugated tube coming into contact with a peripheral part such as a vehicle body may generate sound recognized as abnormal noise.

SUMMARY OF THE INVENTION

In view of the foregoing, it is an object of the present invention to provide a corrugated tube and a wire harness that can suppress occurrence of abnormal noise.

To achieve the object, a corrugated tube according to one aspect of the present invention includes a tubular main body that protects an electric wire accommodated in an internal space; and a tubular or annular outer layer body stacked concentrically with the main body on an outer peripheral surface of the main body, wherein the outer layer body is a molded body formed into a shape having a hardness lower than that of the main body, and capable of absorbing sound when the outer layer body comes into contact with an external contacting object.

A corrugated tube according to another aspect of the present invention includes a tubular main body that protects an electric wire accommodated in an internal space; and a tubular or annular outer layer body stacked concentrically with the main body on an outer peripheral surface of the main body, wherein the outer layer body is a molded body including a material having a hardness lower than that of the main body, and capable of absorbing sound when the outer layer body comes into contact with an external contacting object.

According to still another aspect of the present invention, in the corrugated tube, it is preferable that the main body and the outer layer body are an integral molded body molded integrally with each other.

According to still another aspect of the present invention, in the corrugated tube, it is preferable that the main body is a bellows-shaped molded body in which an annular recess recessed on a side of the outer peripheral surface and an annular protrusion protruding on a side of the outer peripheral surface are concentrically and alternately connected along a cylinder axis direction, and the outer layer body is a bellows-shaped molded body in which an annular layer recess stacked concentrically with the annular recess on an outer peripheral surface of the annular recess and an annular layer protrusion stacked concentrically with the annular protrusion on an outer peripheral surface of the annular protrusion are concentrically and alternately connected along the cylinder axis direction.

According to still another aspect of the present invention, in the corrugated tube, it is preferable that the main body is a bellows-shaped molded body in which an annular recess recessed on a side of the outer peripheral surface and an annular protrusion protruding on a side of the outer peripheral surface are concentrically and alternately connected along a cylinder axis direction, and the outer layer body is an annular molded body provided for each of the annular protrusions, and stacked concentrically with the annular protrusion on an outer peripheral surface of the annular protrusion.

To achieve the object, a wire harness according to still another aspect of the present invention includes an electric wire; and a corrugated tube that protects the electric wire from an outside, wherein the corrugated tube includes a tubular main body that protects the electric wire accommodated in an internal space, and a tubular or annular outer layer body stacked concentrically with the main body on an outer peripheral surface of the main body, and the outer layer body is a molded body formed into a shape having a hardness lower than that of the main body, and capable of absorbing sound when the outer layer body comes into contact with an external contacting object.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a corrugated tube and a wire harness according to the present invention will be described in detail with reference to the drawings. Note that the invention is not limited by this embodiment.

Embodiment

One embodiment of the corrugated tube and the wire harness according to the present invention will be described with reference to FIGS. 1 to 4.

Reference symbol 1 in FIGS. 1 to 4 denotes the corrugated tube of the embodiment. Moreover, reference symbol WH in FIGS. 2 and 4 denotes the wire harness of the embodiment.

Figure 2:
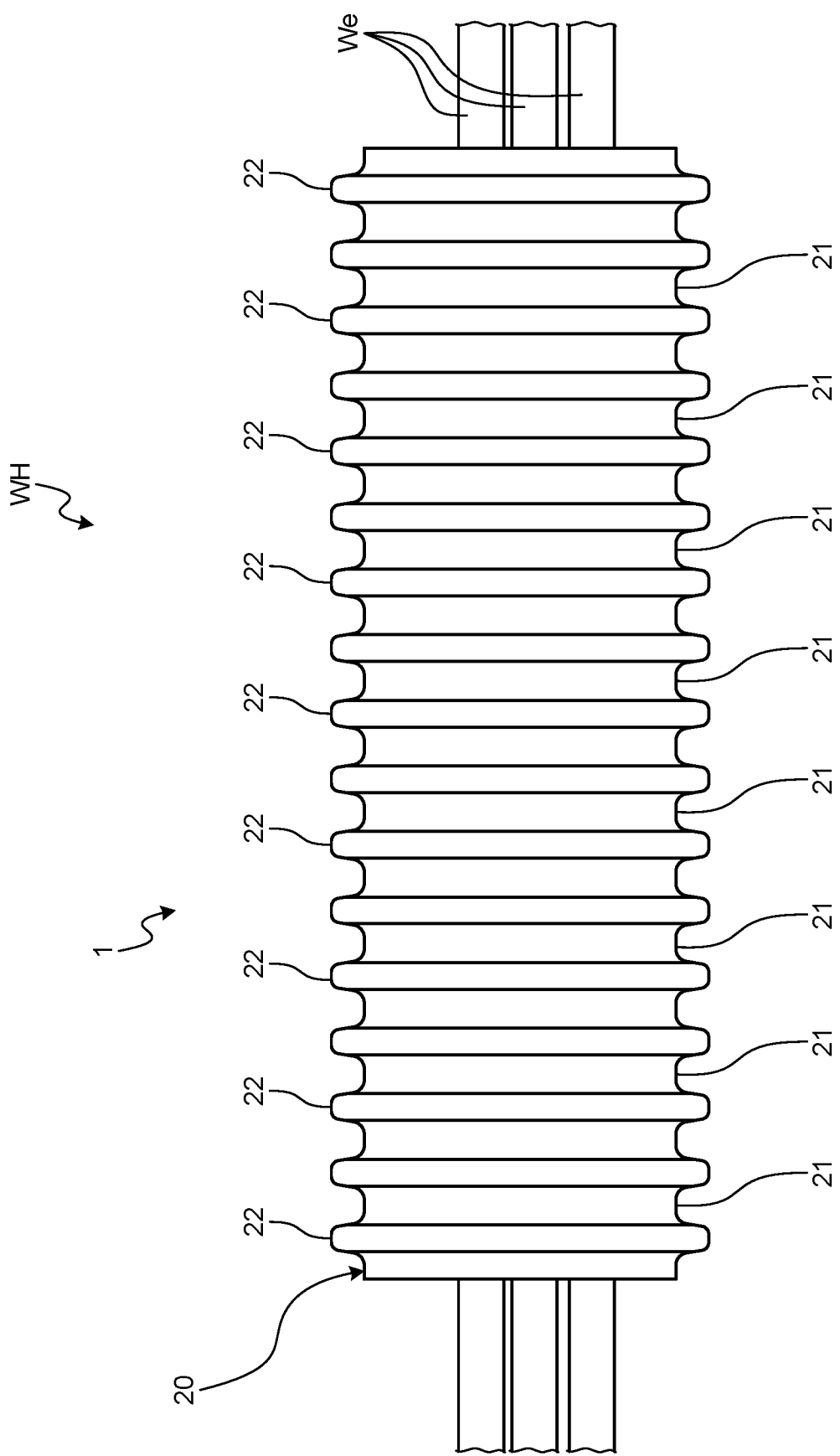
FIG. 2 is a side view illustrating the corrugated tube and a wire harness of the embodiment.
Figure 4:
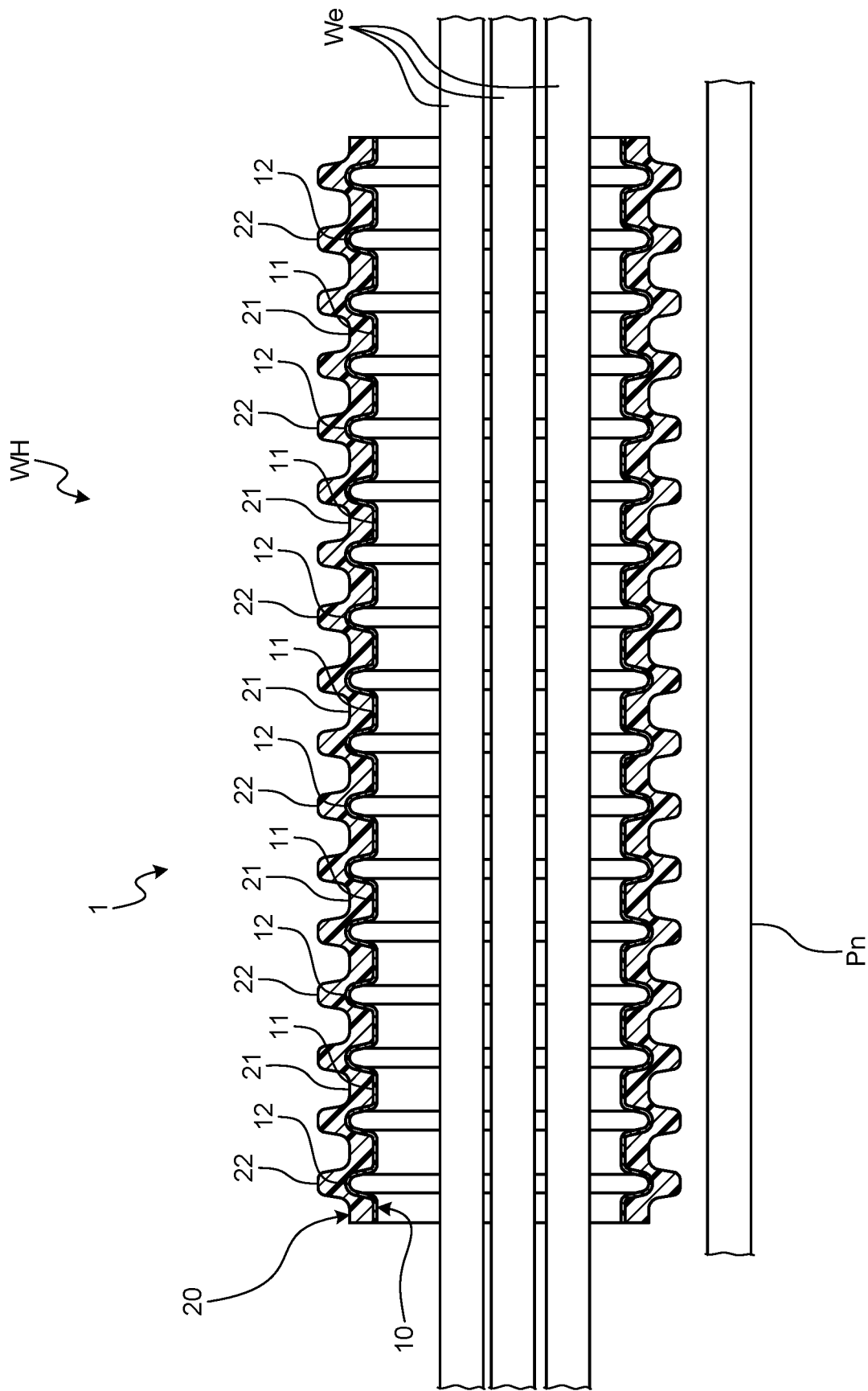
FIG. 4 is a cross-sectional view illustrating the positional relationship among a corrugated tube, an electric wire, and a peripheral part.

The corrugated tube 1 is an exterior member for protecting an electric wire We from the outside (FIGS. 2 and 4). The corrugated tube 1 is used to protect an electric wire We arranged in a vehicle such as an automobile from a peripheral part Pn (FIG. 4) such as a vehicle body, for example. The corrugated tube 1 forms the wire harness WH together with at least one electric wire We which is a part to be protected. For example, in the wire harness WH mounted on a vehicle, the required number of corrugated tubes 1 are provided in the entire electric wire We except for a connector joining point or the like and/or a part of the electric wire We that needs to be protected from the peripheral part Pn.

Figure 1:
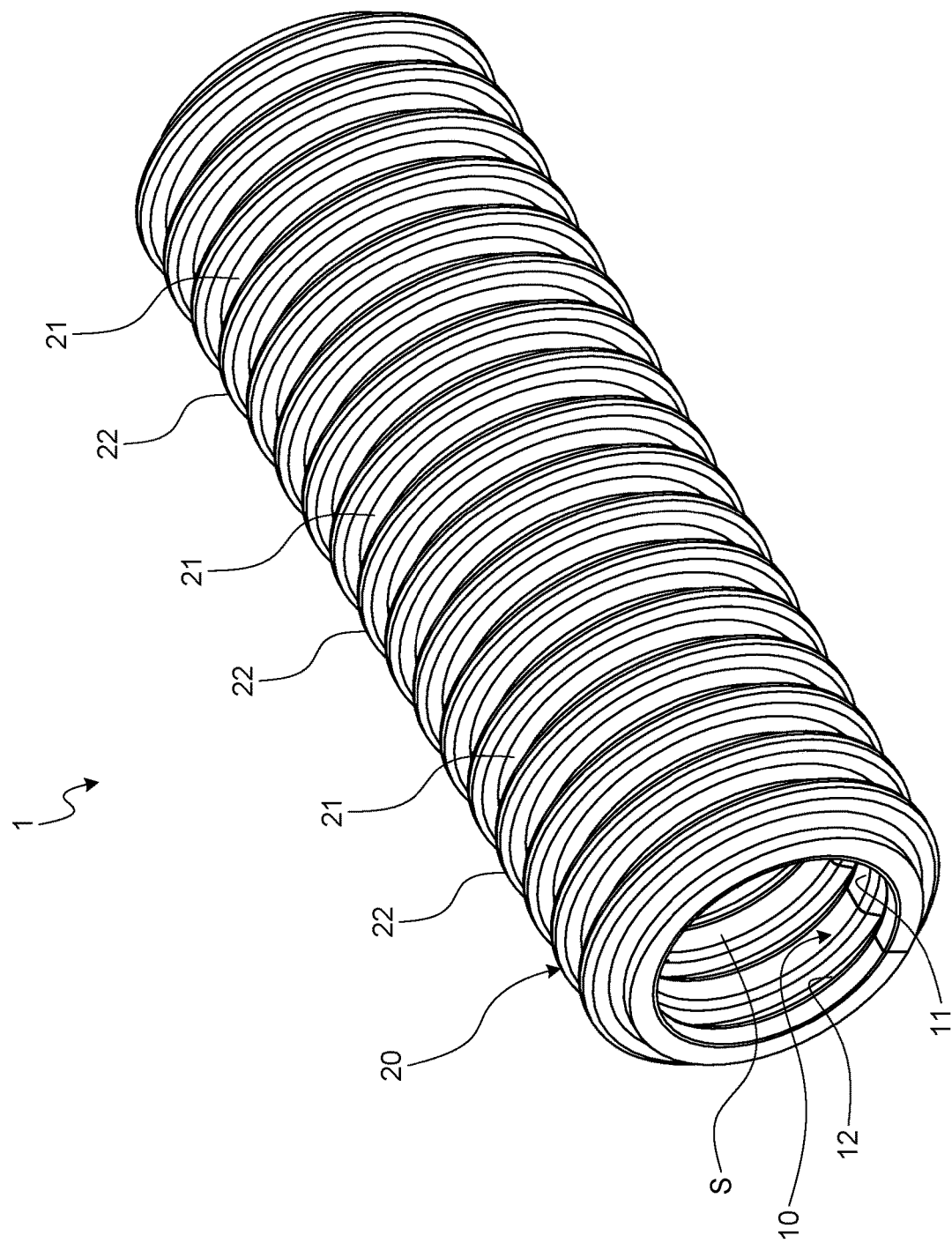
FIG. 1 is a perspective view illustrating a corrugated tube of an embodiment.
Figure 3:
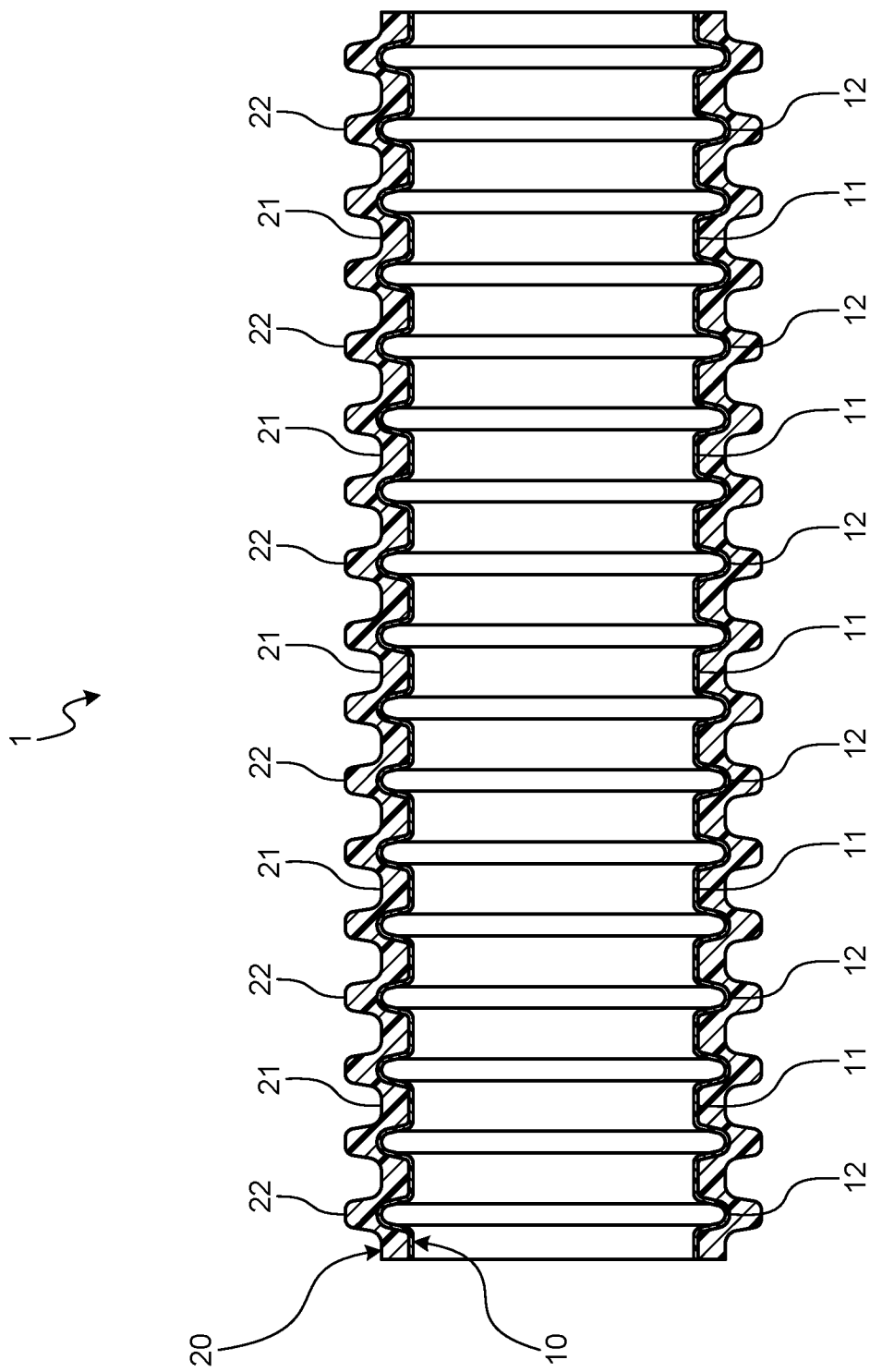
FIG. 3 is a cross-sectional view illustrating the corrugated tube of the embodiment.

The corrugated tube 1 includes a cylindrical main body 10 that protects the electric wire We accommodated in an internal space S (FIGS. 1, 3, and 4). The main body 10 is a molded body formed of an insulating material such as a synthetic resin. For example, the main body 10 is formed using a polypropylene resin, a polyamide resin, or the like as the material.

In this example, the main body 10 is formed in a bellows shape. Accordingly, in the exemplified main body 10, an annular recess 11 recessed on the outer peripheral surface side and an annular protrusion 12 protruding on the outer peripheral surface side are concentrically and alternately connected along the cylinder axis direction (FIGS. 3 and 4). Here, the main body 10 is formed as a substantially cylindrical and bellows-shaped molded body including multiple ring-shaped annular recesses 11 and multiple ring-shaped annular protrusions 12.

Furthermore, the corrugated tube 1 includes a tubular outer layer body 20 stacked concentrically with the main body 10 on an outer peripheral surface of the main body 10 (FIGS. 1 to 4). The outer layer body 20 is a molded body formed of an insulating material such as a synthetic resin.

The outer layer body 20 is provided to suppress generation of abnormal noise when the outer layer body 20 comes into contact with the peripheral part Pn. Hence, the outer layer body 20 is formed to be a molded body having a shape whose hardness is lower than that of the main body 10, and capable of absorbing sound when the outer layer body 20 comes into contact with the peripheral part Pn which is an external contacting object. As the insulating material forming the outer layer body 20, a material is used which has a hardness lower than that of the material forming the main body 10, and is capable of absorbing sound when the outer layer body 20 comes into contact with the peripheral part Pn which is an external contacting object. As this insulating material, a material is selected which can achieve a desired sound absorbing effect depending on the thickness of the outer layer body 20 in the stacking direction, the material of the peripheral part Pn, the shape of the peripheral part Pn, and the like. For example, the outer layer body 20 is formed of a material such as a polyolefin resin, a polyamide resin, a vinyl chloride resin, a silicone resin, a fluororesin, a polycarbonate resin, a polyimide resin, a polyester resin, or a polyurethane resin.

The outer layer body 20 may be formed integrally with the outer peripheral surface of the main body 10, or may be applied and formed on the outer peripheral surface of the main body 10, for example.

The exemplified main body 10 and outer layer body 20 are an integral molded body molded integrally with each other. For example, the corrugated tube 1 is formed by extruding the material forming the main body 10 and the material forming the outer layer body 20 in the form of concentrically stacked cylinders by an extruder (not shown), and sending the resultant product to a molding machine (not shown) to form the bellows shape with the forming mold. Hence, it is desirable to use the same series of materials for the main body 10 and the outer layer body 20. Thus, the main body 10 and the outer layer body 20 can be integrated with each other without using an adhesive or the like.

Specifically, the outer layer body 20 of the embodiment is formed into a tubular and bellows-shaped molded body concentric with the main body 10. Accordingly, in the outer layer body 20, an annular layer recess 21 stacked concentrically with the annular recess 11 on an outer peripheral surface of the annular recess 11 and an annular layer protrusion 22 stacked concentrically with the annular protrusion 12 on an outer peripheral surface of the annular protrusion 12 are concentrically and alternately connected along the cylinder axis direction (FIGS. 3 and 4). Here, the outer layer body 20 is formed as a substantially cylindrical and bellows-shaped molded body including multiple ring-shaped annular layer recesses 21 and multiple ring-shaped annular layer protrusions 22.

With this corrugated tube 1, even if an external force caused by road surface input or the like is transmitted and accidentally brings the corrugated tube 1 into contact with the peripheral part Pn, the outer layer body 20 is brought into contact with the peripheral part Pn without bringing the main body 10 into contact the peripheral part Pn. Hence, the corrugated tube 1 can allow the outer layer body 20 to absorb sound generated when the corrugated tube 1 comes into contact with the peripheral part Pn, and can therefore suppress generation of abnormal noise at this time.

Thus, the corrugated tube 1 of the embodiment can not only exhibit the function of protecting the electric wire We, which is the original function, but also suppress generation of abnormal noise when the corrugated tube 1 accidentally comes into contact with the peripheral part Pn. Moreover, the wire harness WH of the embodiment includes the corrugated tube 1, and can similarly achieve the effect exhibited by the corrugated tube 1.

Modification

Figure 5:
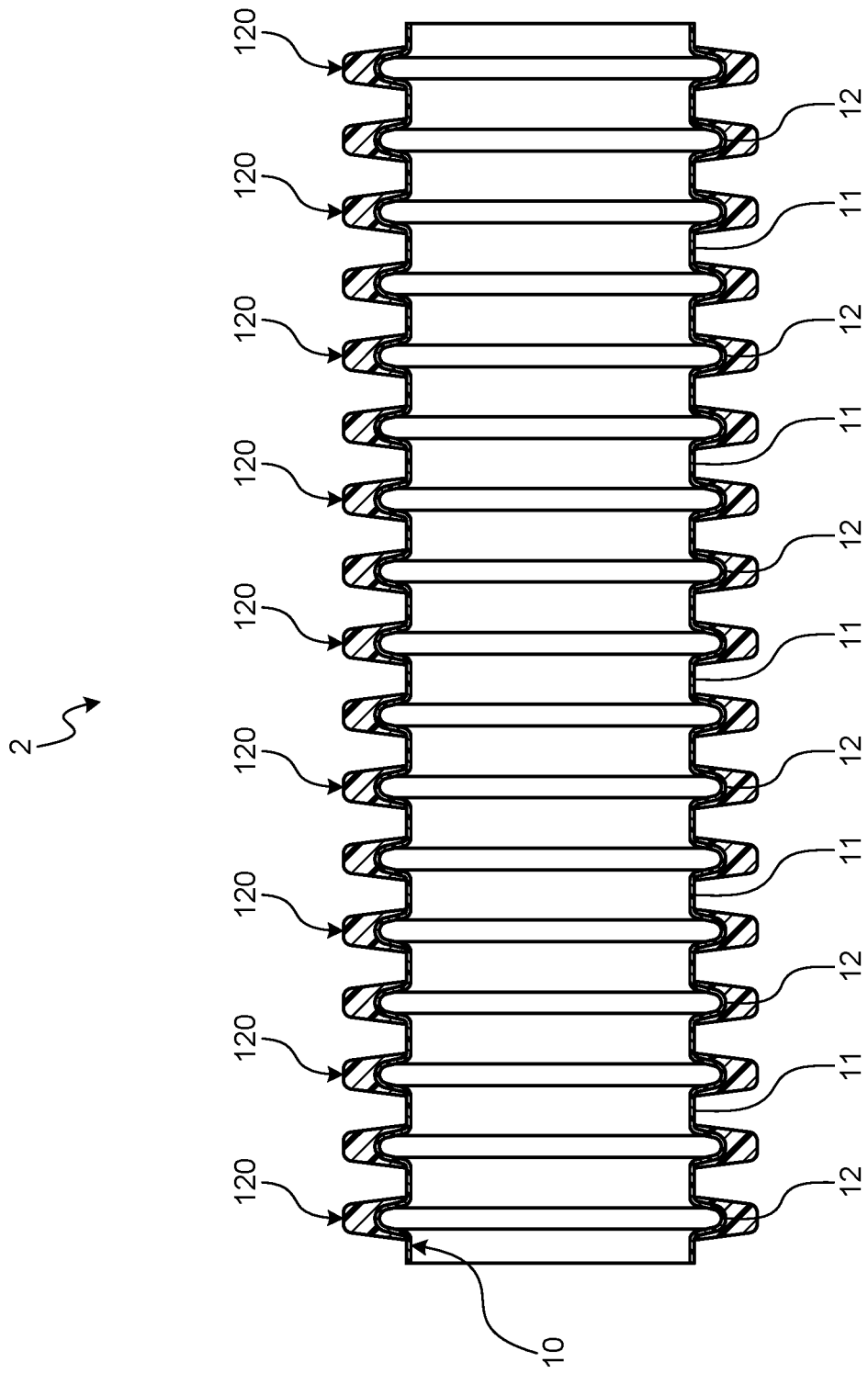
FIG. 5 is a cross-sectional view illustrating a corrugated tube of a modification.

Reference numeral 2 in FIG. 5 denotes a corrugated tube of a modification. The corrugated tube 2 is the corrugated tube 1 included in the wire harness WH of the embodiment in which the outer layer body 20 is replaced with an outer layer body 120 described below.

Similar to the outer layer body 20 of the embodiment, the outer layer body 120 is provided to suppress generation of abnormal noise when the outer layer body 120 comes into contact with a peripheral part Pn. Hence, the outer layer body 120 is formed using a material similar to that of the outer layer body 20 of the embodiment. As in the case of the outer layer body 20, the outer layer body 120 may be formed integrally with an outer peripheral surface of a main body 10, or may be applied and formed on the outer peripheral surface of the main body 10. In the modification, too, the main body 10 and the outer layer body 120 are an integral molded body molded integrally with each other.

The outer layer body 120 of the modification is an annular molded body stacked concentrically with the main body 10 on the outer peripheral surface of the main body 10. Specifically, the outer layer body 120 is provided for each of annular protrusions 12 of the main body 10, and is provided as an annular molded body stacked concentrically with the annular protrusion 12 on an outer peripheral surface of the annular protrusion 12 of the main body 10.

The corrugated tube 2 of the modification is provided with the outer layer body 120 for each of the annular protrusions 12, and an outer peripheral surface of each of annular recesses 11 is exposed. However, similar to the corrugated tube 1 of the embodiment, the outer layer body 120 can be brought into contact with the peripheral part Pn without bringing the main body 10 into contact with the peripheral part Pn. Hence, the corrugated tube 2 can allow the outer layer body 120 to absorb sound generated when the corrugated tube 2 comes into contact with the peripheral part Pn, and can therefore suppress generation of abnormal noise at this time.

Thus, similar to the corrugated tube 1 of the embodiment, the corrugated tube 2 of the modification can not only exhibit the function of protecting an electric wire We, which is the original function, but also suppress generation of abnormal noise when the corrugated tube 2 accidentally comes into contact with the peripheral part Pn. Moreover, a wire harness WH of the modification includes the corrugated tube 2, and can similarly achieve the effect exhibited by the corrugated tube 2.

With a corrugated tube according to the present embodiment, even if the corrugated tube is accidentally brought into contact with a peripheral part, an outer layer body is brought into contact with the peripheral part without bringing the main body into contact the peripheral part. Hence, the corrugated tube can allow the outer layer body to absorb sound generated when the corrugated tube comes into contact with the peripheral part, and can therefore suppress generation of abnormal noise at this time. Thus, the corrugated tube according to the present embodiment can not only exhibit the function of protecting an electric wire, which is the original function, but also suppress generation of abnormal noise when the corrugated tube accidentally comes into contact with a peripheral part. Moreover, a wire harness according to the present embodiment includes the above corrugated tube, and can similarly achieve the effect exhibited by the corrugated tube.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A corrugated tube comprising:
a tubular main body that protects an electric wire accommodated in an internal space; and
a tubular or annular outer layer body stacked concentrically with the main body on an outer peripheral surface of the main body, wherein
the outer layer body is a molded body formed into a shape having a hardness lower than that of the main body, and capable of absorbing sound when the outer layer body comes into contact with an external contacting object,
the main body is a bellows-shaped molded body in which an annular recess recessed on a side of the outer peripheral surface and an annular protrusion protruding on a side of the outer peripheral surface are concentrically and alternately connected along a cylinder axis direction,
the outer layer body is an annular molded body provided for each of the annular protrusions of the main body, and stacked concentrically with the annular protrusion on an outer peripheral surface of the annular protrusion of the main body, and
an outer peripheral surface of each of the annular recesses of the main body is exposed.

2. A corrugated tube comprising:
a tubular main body that protects an electric wire accommodated in an internal space; and
a tubular or annular outer layer body stacked concentrically with the main body on an outer peripheral surface of the main body, wherein
the outer layer body is a molded body including a material having a hardness lower than that of the main body, and capable of absorbing sound when the outer layer body comes into contact with an external contacting object,
the main body is a bellows-shaped molded body in which an annular recess recessed on a side of the outer peripheral surface and an annular protrusion protruding on a side of the outer peripheral surface are concentrically and alternately connected along a cylinder axis direction,
the outer layer body is an annular molded body provided for each of the annular protrusions of the main body, and stacked concentrically with the annular protrusion on an outer peripheral surface of the annular protrusion of the main body, and
an outer peripheral surface of each of the annular recesses of the main body is exposed.

3. The corrugated tube according to claim 1, wherein the main body and the outer layer body are an integral molded body molded integrally with each other.

4. The corrugated tube according to claim 2, wherein the main body and the outer layer body are an integral molded body molded integrally with each other.

5. A wire harness comprising:
an electric wire; and
a corrugated tube that protects the electric wire from an outside, wherein
the corrugated tube includes
a tubular main body that protects the electric wire accommodated in an internal space, and
a tubular or annular outer layer body stacked concentrically with the main body on an outer peripheral surface of the main body, and
the outer layer body is a molded body formed into a shape having a hardness lower than that of the main body, and capable of absorbing sound when the outer layer body comes into contact with an external contacting object,
the main body is a bellows-shaped molded body in which an annular recess recessed on a side of the outer peripheral surface and an annular protrusion protruding on a side of the outer peripheral surface are concentrically and alternately connected along a cylinder axis direction, the outer layer body is an annular molded body provided for each of the annular protrusions of the main body, and stacked concentrically with the annular protrusion on an outer peripheral surface of the annular protrusion of the main body, and an outer peripheral surface of each of the annular recesses of the main body is exposed.

* * * * *